United States Patent
Suzuki

(10) Patent No.: US 12,236,557 B2
(45) Date of Patent: Feb. 25, 2025

(54) DISPLAY APPARATUS CONTROLLING METHOD, DISPLAY APPARATUS, AND CONTROL CHIP

(71) Applicant: SEIKO EPSON CORPORATION, Tokyo (JP)

(72) Inventor: Naoki Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/877,274

(22) Filed: Jul. 29, 2022

(65) Prior Publication Data

US 2023/0031094 A1 Feb. 2, 2023

(30) Foreign Application Priority Data

Jul. 30, 2021 (JP) ................................ 2021-125857

(51) Int. Cl.
| | |
|---|---|
| *G06T 3/60* | (2024.01) |
| *G06T 3/40* | (2006.01) |
| *G09G 3/00* | (2006.01) |

(52) U.S. Cl.
CPC ................ *G06T 3/60* (2013.01); *G06T 3/40* (2013.01); *G09G 3/001* (2013.01); *G09G 2340/045* (2013.01); *G09G 2340/0492* (2013.01)

(58) Field of Classification Search
CPC . G06T 3/60; G06T 3/40; G09G 3/001; G09G 2340/045; G09G 2340/0492
See application file for complete search history.

(56) References Cited

U.S. PATENT DOCUMENTS

| | | | |
|---|---|---|---|
| 2007/0249396 A1 | 10/2007 | Nitta et al. | |
| 2011/0181636 A1 | 7/2011 | Fukazawa | |
| 2015/0036944 A1* | 2/2015 | Restrepo | G06T 5/20 382/296 |
| 2015/0212656 A1* | 7/2015 | Lin | G06F 3/0481 715/800 |
| 2018/0246329 A1* | 8/2018 | Bamberger | G06F 1/1694 |
| 2019/0146558 A1* | 5/2019 | Ohata | G09G 5/00 361/679.21 |

(Continued)

FOREIGN PATENT DOCUMENTS

| | | |
|---|---|---|
| JP | H07-210668 A | 8/1995 |
| JP | H8-168039 A | 6/1996 |
| JP | 2002-94877 A | 3/2002 |

(Continued)

OTHER PUBLICATIONS

Seiko Epson Corporation, "Stabilization with MacBook Pro", A Comparison of Output Times and Post-Correction Impressions with Video Editing Software and Apps, 2017, provided to POA on Jul. 15, 2022, 19 pages.

*Primary Examiner* — Antonio A Caschera
(74) *Attorney, Agent, or Firm* — Dority & Manning, P.A.

(57) ABSTRACT

A display apparatus controlling method includes accepting input of a first image signal representing a first image, generating a second image signal by applying a first process of rotating the first image to the first image signal in accordance with the amount of rotation of the display apparatus calculated based on an output signal from an inertial sensor fixed to the display apparatus, and displaying on a display surface a display image corresponding to a second image based on the second image signal.

13 Claims, 8 Drawing Sheets

(56) References Cited

U.S. PATENT DOCUMENTS

2021/0020144 A1* 1/2021 Sun .......................... G09G 5/32
2021/0352217 A1* 11/2021 Querre ................... H04N 23/80

FOREIGN PATENT DOCUMENTS

| JP | 2008-47406 A | 2/2008 |
| JP | 2009-175174 A | 8/2009 |
| JP | 2010-102064 A | 5/2010 |
| JP | 2012-165091 A | 8/2012 |
| JP | 2014-211641 A | 11/2014 |
| JP | 2020-140145 A | 9/2020 |
| WO | WO2006/033245 A | 5/2008 |

* cited by examiner

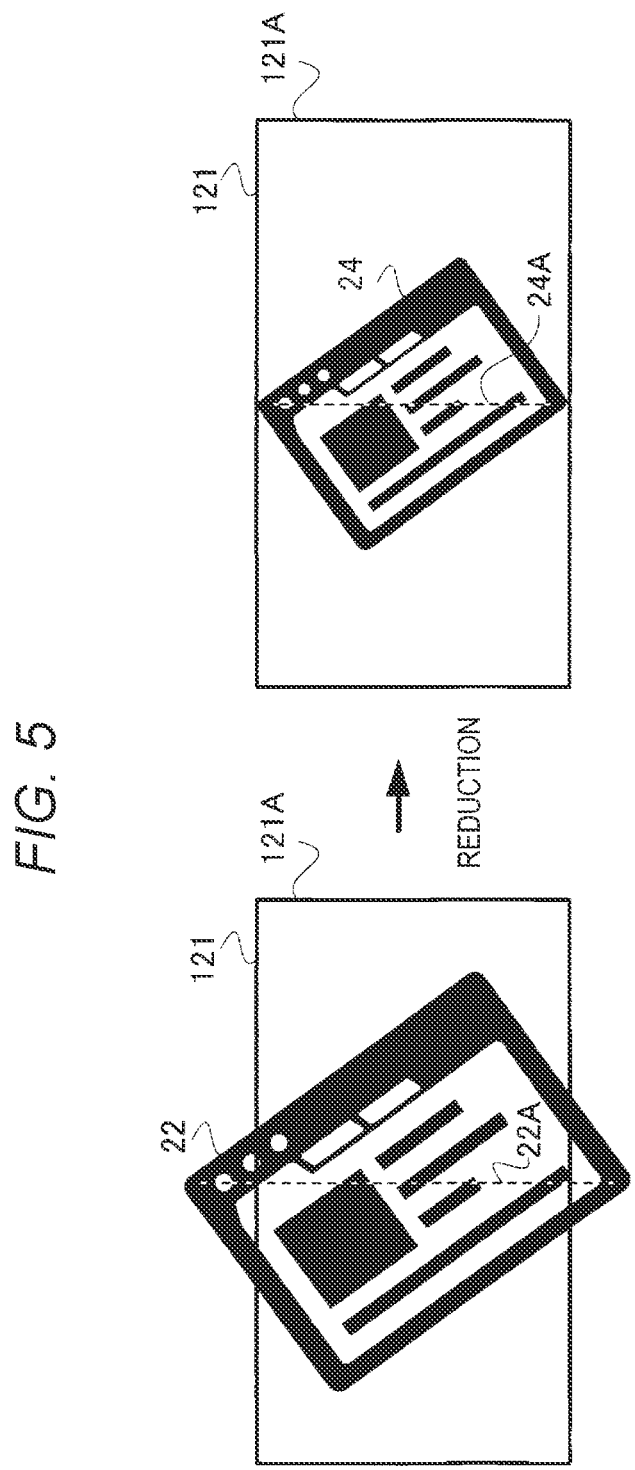

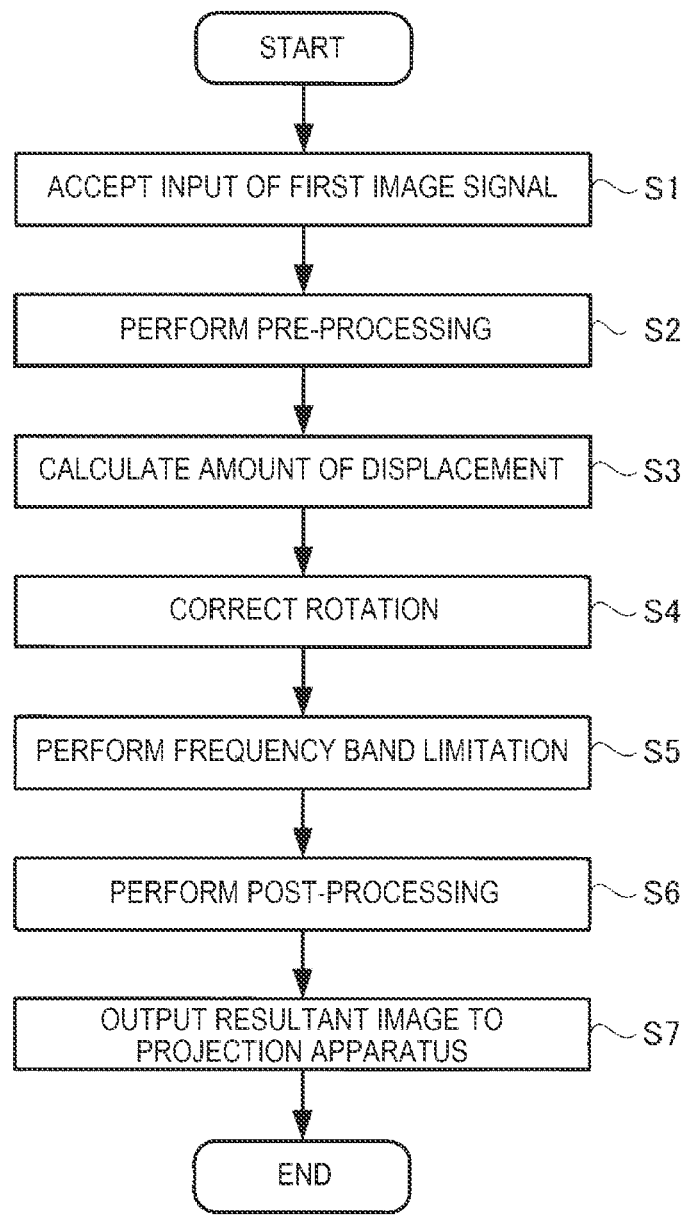

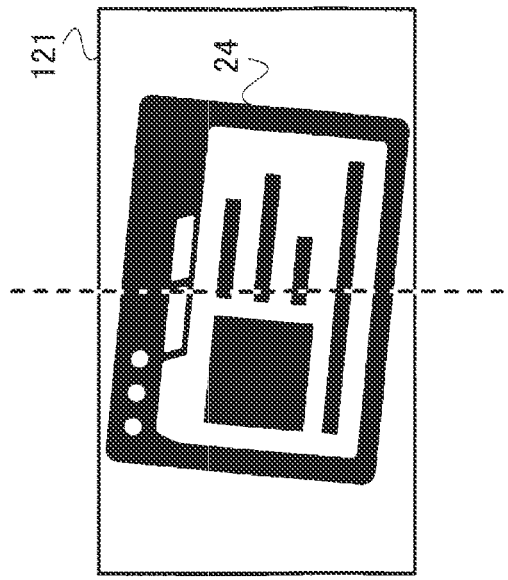
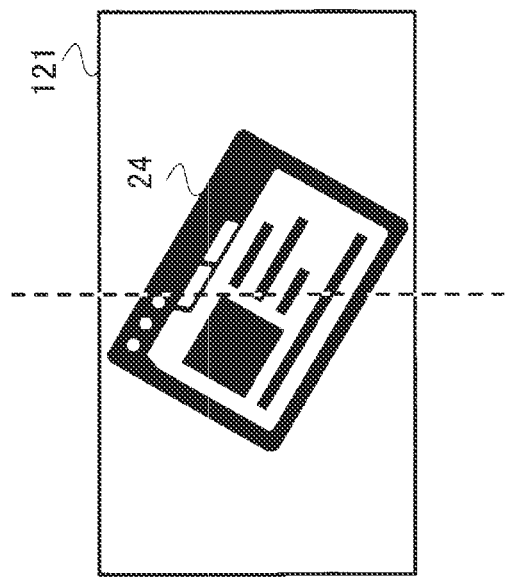
FIG. 9

DISPLAY APPARATUS CONTROLLING METHOD, DISPLAY APPARATUS, AND CONTROL CHIP

The present application is based on, and claims priority from JP Application Serial Number 2021-125857, filed Jul. 30, 2021, the disclosure of which is hereby incorporated by reference herein in its entirety.

BACKGROUND

1. Technical Field

The present disclosure relates to a display apparatus controlling method, a display apparatus, and a control chip.

2. Related Art

When a projector vibrates, a projection image projected by the projector also shifts in accordance with the vibration. In particular, when the projector rotates due to vibration, there has been a technology used to correct the shift of the projection image by rotating the projection image in the direction opposite to the direction in which the projector itself rotates.

For example, JP-A-2008-47406 discloses an illuminator having a projector function. The illuminator according to JP-A-2008-47406 includes a swing detector that detects that a projection section is swinging and an image shift compensator that compensates the shift of a projection image caused by the swing based on the swing detected by the swing detector.

The technology according to JP-A-2008-47406, however, causes a projector module itself to rotate in order to rotate the projection image and project it as an upright image. The projector module is a module including a projection lens, a liquid crystal panel, an LED light source, a lens driver, a liquid crystal driver, and an LED driver. That is, to rotate the projection image, the technology described in JP-A-2008-47406 requires a complex mechanism that rotationally drives the projector module formed of the variety of components.

SUMMARY

A display apparatus controlling method according to an aspect of the present disclosure is a display apparatus controlling method including accepting input of a first image signal representing a first image, generating a second image signal by applying a first process corresponding to rotation of the first image to the first image signal in accordance with an amount of rotation of the display apparatus calculated based on an output signal from an inertial sensor fixed to the display apparatus, and displaying on a display surface a display image corresponding to a second image based on the second image signal.

A display apparatus according to another aspect of the present disclosure is a display apparatus including an acceptance section that accepts input of a first image signal representing a first image, a first processing section that generates a second image signal by applying a first process corresponding to rotation of the first image to the first image signal in accordance with an amount of rotation of the display apparatus calculated based on an output signal from an inertial sensor fixed to the display apparatus, and a display control section that displays on a display surface a display image corresponding to a second image based on the second image signal.

A control chip that controls a display apparatus according to another aspect of the present disclosure is a control chip including an input section that accepts input of a first image signal representing a first image, a first processing section that generates a second image signal by applying a first process corresponding to rotation of the first image to the first image signal in accordance with an amount of rotation of the display apparatus calculated based on an output signal from an inertial sensor fixed to the display apparatus, and an output section that outputs a second image based on the second image signal.

BRIEF DESCRIPTION OF THE DRAWINGS

FIG. 5 shows how the display apparatus according to the first embodiment reduces the projection image.

FIG. 6 is a flowchart showing the operation of the display apparatus according to the first embodiment.

FIG. 9 shows a reduction factor in accordance with which the projection image is achieved in Variation 1.

DESCRIPTION OF EXEMPLARY EMBODIMENTS

Figure 1:
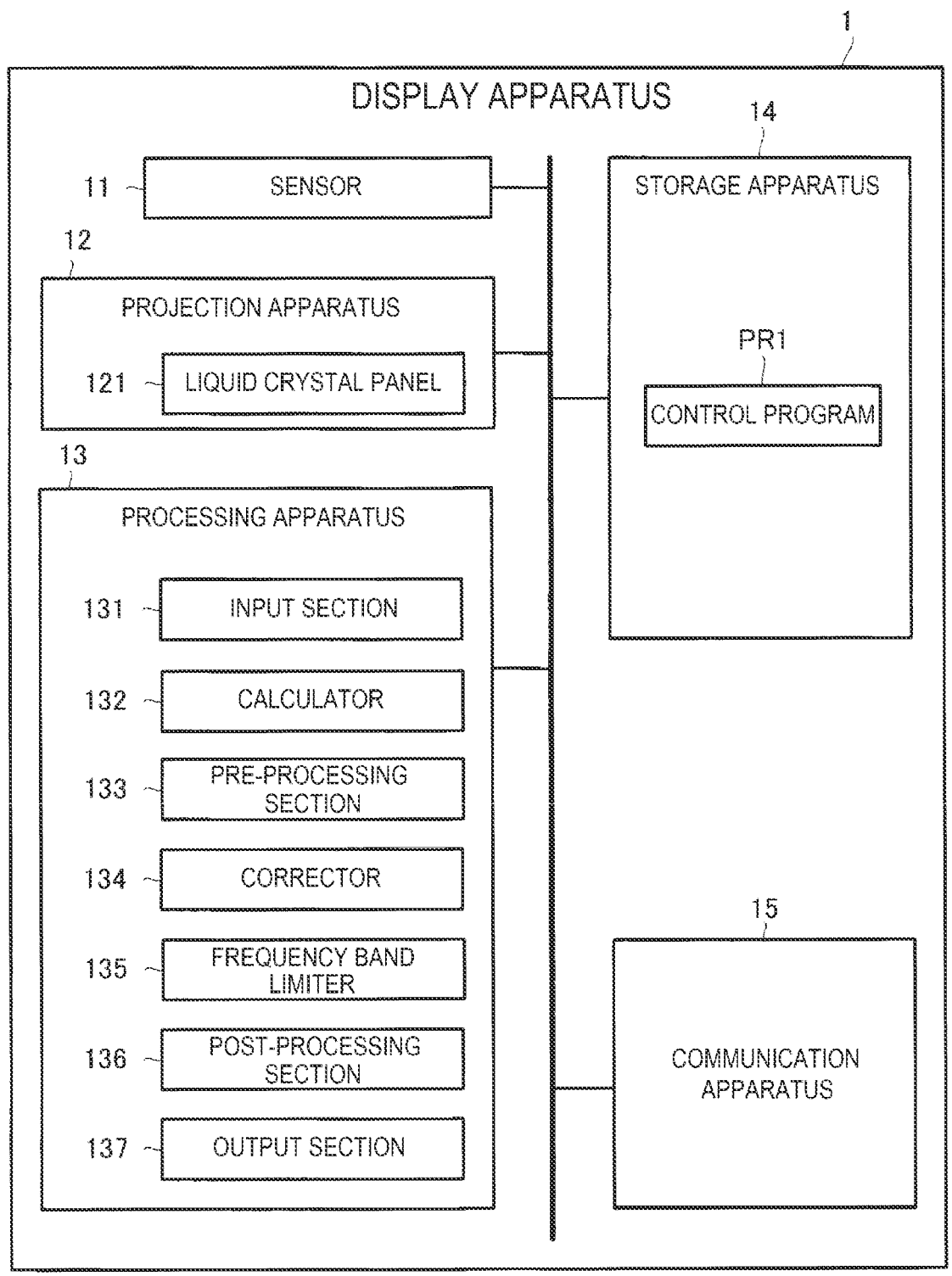
FIG. 1 is a block diagram showing the configuration of a display apparatus according to a first embodiment.

A display apparatus controlling method, a display apparatus, and a control chip according to embodiments will be described below with reference to the drawings. It is noted that the dimensions and scale of each portion in the drawings differ from actual values as appropriate. A variety of technically preferable restrictions are imposed on the embodiments described below, which are preferable specific examples, and the scope of the present disclosure is, however, not limited to the embodiments unless the following description states that particular restrictions are imposed on the present disclosure.

1. First Embodiment

1-1. Configuration of First Embodiment

Figure 2:
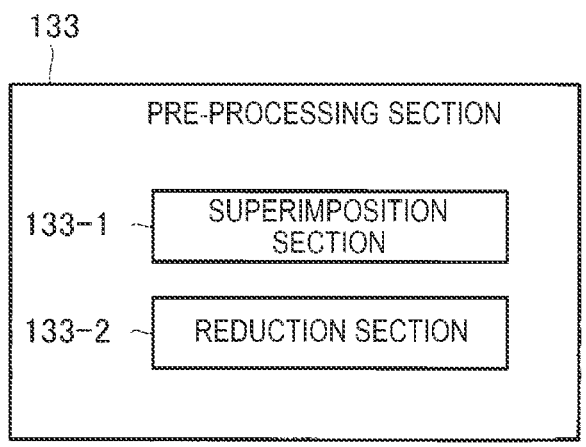
FIG. 2 is a functional block diagram showing the configuration of a pre-processing section provided in the display apparatus according to the first embodiment.
Figure 3:
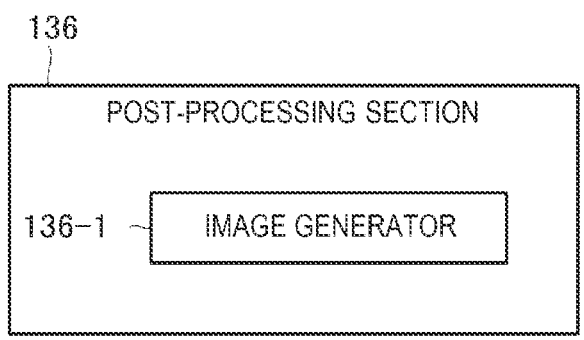
FIG. 3 is a functional block diagram showing the configuration of a post-processing section provided in the display apparatus according to the first embodiment.

FIG. 1 is a block diagram showing the configuration of a display apparatus 1 according to a first embodiment. FIG. 2 is a functional block diagram showing the configuration of a pre-processing section 133 provided in the display apparatus 1. FIG. 3 is a functional block diagram showing the configuration of a post-processing section 136 provided in the display apparatus 1. FIGS. 4A to 4E show how the display apparatus 1 corrects a projection image. FIG. 5 shows how the display apparatus 1 reduces the projection image. The configuration of the display apparatus 1 according to the first embodiment will be described below with reference to FIGS. 1 to 5.

The display apparatus 1 includes a sensor 11, a projection apparatus 12, a processing apparatus 13, a storage apparatus 14, and a communication apparatus 15, as shown in FIG. 1. The display apparatus 1 may be a projector by way of example, but not necessarily in the embodiment of the present disclosure. The elements of the display apparatus 1 are connected to each other via a single bus or a plurality of buses for information communication. The elements of the display apparatus 1 are each formed of a single instrument or a plurality of instruments. Part of the elements of the display apparatus 1 may be omitted.

The sensor 11 is an inertial sensor that senses rotation of the display apparatus 1. The sensor 11 may, for example, be an acceleration sensor, a gyro sensor, or a sensor including an acceleration sensor and a gyro sensor. The sensor 11 is accommodated in an enclosure that is not shown but is part of the first projector 1, is fixed to the projector 1, and can therefore sense vibration of the projector 1.

The projection apparatus 12 is an apparatus that projects a projection image outputted by an output section 137, which will be described later, onto a screen, a wall, or any other surface. The screen or the wall is an example of a display surface. The projection apparatus 12 projects a variety of images under the control of the processing apparatus 13. The projection apparatus 12 includes, for example, a light source, a liquid crystal panel 121 having an oblong shape, and a projection lens, modulates the light from the light source with the aid of the liquid crystal panel 121, and radiates the modulated light onto the screen, the wall, or any other surface via the projection lens. A variety of images are thus projected onto the display surface. The liquid crystal panel 121 is an example of a display panel.

The processing apparatus 13 is a processor that controls the entire display apparatus 1 and is formed, for example, of a single control chip or a plurality of control chips. The processing apparatus 13 is formed, for example, of a central processing unit (CPU) including interfaces with peripheral apparatuses, an arithmetic operation apparatus, a register, and other components. Part or entirety of the functions of the processing apparatus 13 may be realized by hardware, such as a DSP (digital signal processor), an ASIC (application specific integrated circuit), a PLD (programmable logic device), and an FPGA (field programmable gate array). The processing apparatus 13 concurrently or successively carry out a variety of processes.

The storage apparatus 14 is a recording medium readable by the processing apparatus 13 and stores a plurality of programs including a control program PR1 to be executed by the processing apparatus 13. The storage apparatus 14 further stores a first image signal accepted by an input section 131, which will be described later, a second image signal representing the projection image and processed by the post-processing section 136, which will be described later, and the projection image. The storage apparatus 14 may be formed, for example, of at least one of a ROM (read only memory), an EPROM (erasable programmable ROM), an EEPROM (electrically erasable programmable ROM), and a RAM (random access memory). The storage apparatus 14 may be called, for example, a register, a cache, a main memory, or a primary storage.

The communication apparatus 15 is hardware as a transmission/reception device that communicates with other apparatuses, and is formed, for example, of an interface circuit and a wireless communication antenna. In particular, in the present embodiment, the communication apparatus 15 is a communication apparatus that connects the display apparatus 1 to other apparatuses via wired or wireless connection. The communication apparatus 15 is also called, for example, a network device, a network controller, a network card, and a communication module.

The processing apparatus 13 functions as the input section 131, a calculator 132, the pre-processing section 133, a corrector 134, a frequency band limiter 135, the post-processing section 136, and the output section 137 by reading the control program PR1 from the storage apparatus 14 and executing the program. The control program PR1 may be transmitted from another apparatus, such as a server that manages the display apparatus 1, via a communication network that is not shown.

The input section 131 accepts input of the first image signal representing a first image. In more detail, the input section 131 may accept input of the first image signal representing the first image stored in the storage apparatus 14. Instead, the input section 131 may accept input of the first image signal representing the first image from an apparatus external to the display apparatus 1. The input section 131 is also referred herein to as an "acceptance section 131".

The calculator 132 calculates the amount of rotation of the display apparatus 1 around the optical axis thereof based on an output signal from the sensor 11. For example, when the sensor 11 is a gyro sensor, it is assumed that the posture of the display apparatus 1 is defined by orthogonal axes, roll, pitch, and yaw axes. The calculator 132 can calculate the amount of displacement of the posture of the display apparatus 1 by integrating once with time the values of angular velocity around the roll, pitch, and yaw axes detected by the sensor 11. The calculator 132 further calculates the amount of rotation of the display apparatus 1 around the optical axis thereof based on the positional relationship between the display apparatus 1 and the display surface and the angle of the optical axis with respect to the display surface in addition to the amount of displacement of the posture of the display apparatus 1. The amount of rotation of the display apparatus 1 around the optical axis thereof is in other words the amount of rotation of radiated light, by which the display apparatus 1 displays a display image, around the central axis of the radiated light. The amount of rotation of the display apparatus 1 around the optical axis thereof represents the rotation of the display apparatus 1.

For example, when the sensor 11 is instead an acceleration sensor, it is assumed that the display apparatus 1 is installed in a three-dimensional space expressed by x, y, and z. The calculator 132 can calculate the amount of displacement of the position of the display apparatus 1 by integrating twice with time the values of acceleration in the axes x, y, and z detected by the sensor 11. The calculator 132 further calculates the amount of rotation of the display apparatus 1 around the optical axis thereof based on the positional relationship between the display apparatus 1 and the display surface and the angle of the optical axis with respect to the display surface in addition to the amount of displacement of the position of the display apparatus 1. In particular, it is preferable that the display apparatus 1 is provided with at least three acceleration sensors, calculates the amounts of displacement of three points of the display apparatus 1, and uses the three amounts of displacement to calculate the amount of rotation of the display apparatus 1 around the optical axis thereof.

The pre-processing section 133 performs pre processing on the first image signal before the corrector 134, which will be described later, applies to the first image signal a process corresponding to rotation of the first image according to the calculated amount of rotation.

The pre-processing section 133 includes a superimposition section 133-1 and a reduction section 133-2, as shown in FIG. 2.

The superimposition section 133-1 applies to the first image signal a process corresponding to the process of superimposing a superimposition image on the first image. The superimposition image is an OSD (On Screen Display) superimposition image.

The reduction section 133-2 applies to the first image signal a process corresponding to the process of reducing the first image. When the first image signal has been processed by the superimposition section 133-1, the reduction section 133-2 applies to the first image signal a process corresponding to reduction in the outer shape of a composite image of the first image and the superimposition image. The process carried out by the reduction section 133-2 is referred herein to as a "second process" in some cases. The function of the reduction section 133-2 will be described later in detail in the section where the corrector 134 is described.

Referring back to the description with reference to FIG. 1, the corrector 134 applies to the first image signal a process corresponding to the rotation of the first image according to the amount of rotation calculated by the calculator 132. When the first image signal has been processed by the superimposition section 133-1, the corrector 134 applies to the first image signal a process corresponding to the rotation of a composite image of the first image and a second image. The process carried out by the corrector 134 is referred herein to as a "first process" in some cases. The corrector 134 is also referred herein to as a "first processing section 134".

The function of the corrector 134 and further the function of reduction section 133-2 will be described below in detail with reference to FIGS. 4A to 4E and 5.

Figure 4A:
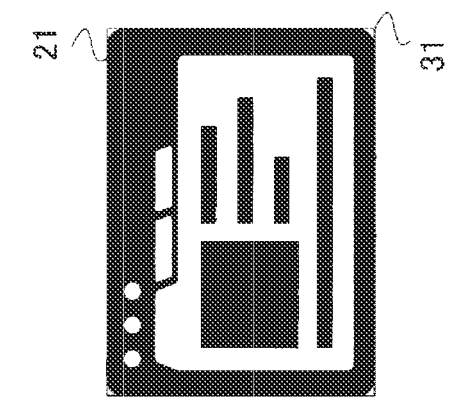
FIGS. 4A to 4E show how the display apparatus according to the first embodiment corrects a projection image.
Figure 4B:
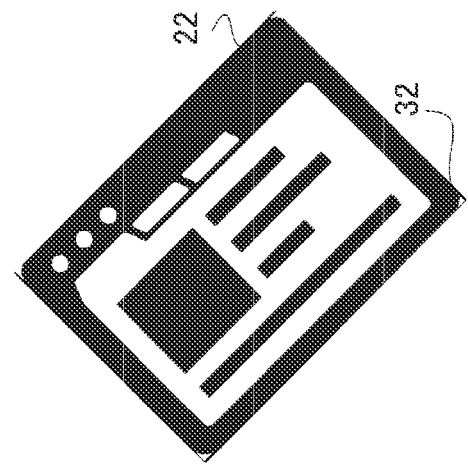
Figure 4C:
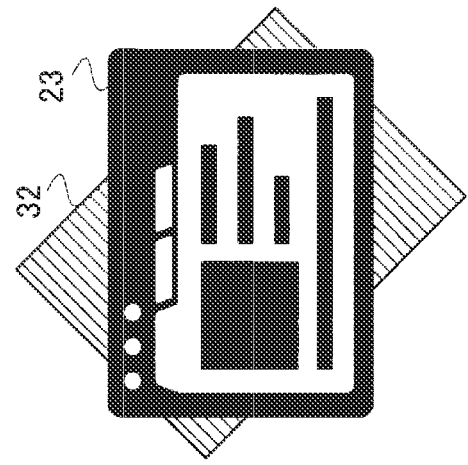
Figure 4E:
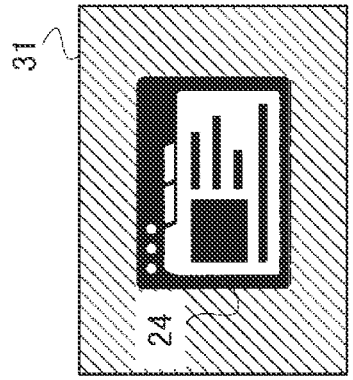
Figure 4D:
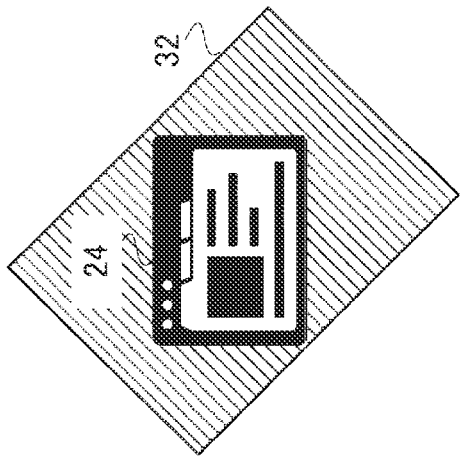

Before rotation of the display section 1 occurs, it is assumed that a projection image 21 as the first image has been displayed across a projection area 31, which is the image display area of the liquid crystal panel 121, as shown in FIG. 4A. Thereafter, when the display apparatus 1 is rotated, the projection area 31 rotates by the amount of the rotation of the display apparatus 1 and becomes a projection area 32, as shown in FIG. 4B. The projection image 21 similarly rotates by the amount of the rotation of the display apparatus 1 and becomes a projection image 22. To correct the rotation, the corrector 134 reversely rotates the projection image 22 by the amount of the rotation of the display apparatus 1 in the direction opposite to the direction of the rotation of the display apparatus 1. The simple reverse rotation of the projection image 22, however, results in a projection image 23, which extends off the projection area 32 of the rotated display apparatus 1, as shown in FIG. 4C. To avoid the problem described above, before the reverse rotation of the projection image 22, the reduction section 133-2 reduces the projection image 22, and then the corrector 134 reversely rotates the projection image 22. As a result, a projection image 24 as a result of the reverse rotation falls within the projection area 32 of the rotated display apparatus 1, as shown in FIG. 4D.

A reduction factor by which the reduction section 133-2 reduces the projection image 22 is a reduction factor by which a diagonal 22A of the projection image 22 is reduced to be shorter than or equal to a short side 121A of the liquid crystal panel 121, as shown in FIG. 5. The reduction factor is an example of a first reduction factor. As a result of the reduction using the reduction factor in the projection image 22, the projection image 22 becomes the projection image 24. As a result, the diagonal 24A of the projection image 24 is shorter than the short side 121A of the liquid crystal panel 121. FIG. 5 clearly shows that the reduction in the size of the projection image 22 to the size of the projection image 24 at the maximum allows the projection image 24 to fall within the liquid crystal panel 121 irrespective of the angle of rotation of the projection image 24. The projection image 24 in turn falls within the projection area 31 shown in FIGS. 4A to 4E.

The reduction section 133-2 may reduce the projection image 22 by the reduction factor described above irrespective of whether or not the projection image 22 is rotated. A display image having the same size can thus be displayed based on a projection image having the same size irrespective of whether or not the projection image 22 is rotated, as shown in FIGS. 4D and 4E. A visual discomfort in the display image caused by the difference between the cases where the display apparatus 1 is rotated or not can thus be suppressed.

When the original projection image 21 as the first image is so small that the rotated projection image 23 falls within the liquid crystal panel 121, the reduction section 133-2 does not need to reduce the projection image 21. In this case, the reduction section 133-2 may add a frame to the projection image 21 in such a way that the size of the composite image of the projection image 21 and the frame coincides with the size of the liquid crystal panel 121. In this case, the corrector 134 rotates the projection image 21 within the frame. The color of the frame attached to the projection image 21 is fixed irrespective of whether or not the projection image 21 is rotated. A visual discomfort in the display screen caused by the difference between the cases where the display apparatus 1 is rotated or not can thus be eliminated.

When the reduction section 133-2 reduces the projection image 21 to generate the projection image 24, the reduction section 133-2 generates one pixel from a plurality of the pixels that form the projection image 21 in such a way that the one pixel forms the center of the plurality of pixels. The reduction section 133-2 therefore substantially limits the frequency band of the first image signal.

Referring back to the description with reference to FIG. 1, the frequency band limiter 135 generates the second image signal by limiting the frequency band of the first image signal having undergone the first process. In more detail, the frequency band limiter 135 generates the second image signal by limiting the frequency band of the first image signal having undergone the first process corresponding to the rotation of the first image, for example, by using a lowpass filter.

For example, when a line displayed as a straight line in the first image becomes, in particular, an oblique line as a result of the rotation of the first image, the oblique line is formed of a coarse line displayed in the form of dots in some cases. To avoid the problem described above, the frequency band limiter 135 makes the coarse line displayed in the form of dots visually smooth by using a lowpass filter to two-dimensionally blur the coarse line.

The frequency band limiter 135 may instead employ a filter other than a lowpass filter, for example, an edge-preserving filter that smooths an image while preserving a target edge in the image. In more detail, the frequency band limiter 135 may employ a filter that filters a neighborhood area having a minimum luminance variance value out of a plurality of neighborhood areas set in a local area, takes the neighborhood area as an area containing no edge, and outputs the average of the luminance in the neighborhood area. Only small edges are thus smoothed while large edges are preserved. The frequency band limiter 135 may store the generated second image signal in the storage apparatus 14. In addition, the frequency band limiter 135 may adjust the degree of frequency band limitation in accordance with the amount of the rotation. Specifically, the frequency band limiter 135 may maximize the degree of frequency band limitation when the amount of the rotation is 45 degrees. The reason for this is that the degree of coarsest of a line displayed in the form of dots is maximized when the amount of the rotation is 45 degrees.

The post-processing section 136 performs post-processing on the second image signal as a process after the process corresponding to the rotation of the first image according to the calculated amount of rotation is applied to the first image signal, as described above.

In the present embodiment, the post-processing section 136 includes an image generator 136-1, as shown in FIG. 3.

The image generator 136-1 generates a projection image itself based on the second image signal generated by the frequency band limiter 135. The image generator 136-1 may store the generated projection image in the storage apparatus 14. The projection image generated by image generator 136-1 is also referred herein to as a "second image".

Referring back to the description with reference to FIG. 1, the output section 137 outputs the projection image generated by the image generator 136-1 to the projection apparatus 12. The output section 137 is also referred herein to as a "display control section 137".

1-2. Operation in First Embodiment

FIG. 6 is a flowchart showing the operation of the display apparatus 1 according to the first embodiment. The operation of the display apparatus 1 will be described below with reference to FIG. 6.

In step S1, the processing apparatus 13 functions as the input section 131 to accept input of the first image signal.

In step S2, the processing apparatus 13 functions as the pre-processing section 133 to perform the pre processing.

In more detail, the processing apparatus 13 functions as the superimposition section 133-1 to apply to the first image signal the process corresponding to the process of superimposing a superimposition image on the first image.

The processing apparatus 13 further functions as the reduction section 133-2 to apply to the first image signal the process corresponding to the reduction of the composite image of the first image and the superimposition image.

In step S3, the processing apparatus 13 functions as the calculator 132 to calculate the amount of rotation of the display apparatus 1 around the optical axis thereof based on the output signal from the sensor 11.

In step S4, the processing apparatus 13 functions as the corrector 134 to apply to the first image signal the process corresponding to the rotation of the first image in accordance with the amount of rotation calculated by the calculator 132.

In step S5, the processing apparatus 13 functions as the frequency band limiter 135 to generate the second image signal by limiting the frequency band of the first image signal having undergone the first process.

In step S6, the processing apparatus 13 functions as the post-processing section 136 to perform the post-processing.

In more detail, the processing apparatus 13 functions as the image generator 136-1 to generate a projection image itself as the second image based on the second image signal.

In step S7, the processing apparatus 13 functions as the output section 137 to output the projection image to the projection apparatus 12.

1-3. Effects Provided by First Embodiment

The display method used by the display apparatus 1 according to the present embodiment includes accepting input of a first image signal representing a first image. The display method generates a second image signal by applying a first process corresponding to rotation of the first image to the first image signal in accordance with the amount of rotation of the display apparatus 1 calculated based on an output signal from an inertial sensor fixed to the display apparatus 1. The display method further includes displaying on a display surface a display image corresponding to the projection image as a second image based on the second image signal.

The display apparatus 1 having the configuration described above electronically rotates the projection image in the direction opposite to the rotation of the display apparatus 1 when the rotation of the display apparatus 1 is sensed. Furthermore, the projection image is rotated in accordance with the amount of rotation of the display apparatus 1. The display apparatus 1 having the simple configuration can thus correct rotational shift of the projection image and display the display image at a desired angle, unlike, for example, the technology for rotating the projector module itself.

In the display method described above, the display apparatus 1 is a projector including the liquid crystal panel 121 as the display panel. Furthermore, when the rotated projection image does not fall within the liquid crystal panel 121, the first image may be reduced and then rotated. The case where the rotated projection image does not fall within the liquid crystal panel 121 also includes a case where the first image is drawn in a size greater than the size of the pixel group that can be drawn by the liquid crystal panel 121.

When the projection image as the first image is as large as the liquid crystal panel 121, rotating the projection image in the direction opposite to the direction of the rotation of the display apparatus 1 causes the projection image to extend off the liquid crystal panel 121. The display apparatus 1 having the configuration described above reduces the projection image before the rotation thereof, whereby the rotated projection image does not extend off the liquid crystal panel 121.

Instead, in the display method described above, the display apparatus 1 may reduce the projection image in advance and rotate the reduced projection image irrespective of whether the rotated projection image extends off the liquid crystal panel 121.

The display apparatus 1 having the configuration described above can reduce the projection image to a predetermined size irrespective of whether or not the rotation is performed by reducing the projection image in advance before the rotation of the projection image. A display image having a predetermined size is therefore displayed on the display surface irrespective of whether or not the projection image is rotated.

In the display method described above, the reduction factor by which the projection image is reduced is a reduction factor by which the diagonal of the projection image is reduced to be shorter than or equal to the short side of the liquid crystal panel 121.

The display apparatus 1 having the configuration described above prevents the projection image from extending off the liquid crystal panel 121 irrespective of how the display apparatus 1 rotates the projection image.

In the embodiment described above, the frequency band limiter 135 generates the second image signal by limiting the frequency band of the first image signal having undergone the process corresponding to the rotation of the first image.

The display apparatus 1 having the configuration described above can smooth, in particular, a displayed oblique line in the rotated projection image.

In the display apparatus 1 according to the present embodiment, the input section 131 accepts input of the first image signal representing the first image. The corrector 134 generates the second image signal by applying a first process corresponding to rotation of the first image to the first image signal in accordance with the amount of rotation of the display apparatus 1 calculated based on the output signal from the inertial sensor fixed to the display apparatus 1. The output section 137 further displays on a display surface a display image corresponding to the projection image as the second image based on the second image signal.

The display apparatus 1 having the configuration described above electronically rotates the projection image in the direction opposite to the rotation of the display apparatus 1 when the rotation of the display apparatus 1 is sensed. Furthermore, the projection image is rotated in accordance with the amount of rotation of the display apparatus 1. The display apparatus 1 having the simple configuration can thus correct rotational shift of the projection image and display the display image at a desired angle, unlike, for example, the technology for rotating the projector module itself.

In a control chip that controls the display apparatus 1 according to the present embodiment, the input section 131 accepts input of the first image signal representing the first image. The corrector 134 generates the second image signal by applying the first process corresponding to rotation of the first image to the first image signal in accordance with the amount of rotation of the display apparatus 1 calculated based on the output signal from the inertial sensor fixed to the display apparatus 1. Furthermore, the output section 137 outputs the second image based on the second image signal.

The display apparatus 1 having the configuration described above electronically rotates the projection image in the direction opposite to the rotation of the display apparatus 1 when the rotation of the display apparatus 1 is sensed. Furthermore, the projection image is rotated in accordance with the amount of rotation of the display apparatus 1. The display apparatus 1 having the simple configuration can thus correct rotational shift of the projection image and display the display image at a desired angle, unlike, for example, the technology for rotating the projector module itself.

2. Second Embodiment

The display apparatus 1 according to a second embodiment is configured in the same manner as the display apparatus 1 according to the first embodiment shown in FIG. 1, except that the post-processing section 136 is replaced with a post-processing section 136A. The difference will be described below. In the embodiments presented below by way of example, an element having the same effect and function as that in the first embodiment has the same reference character used in the description of the first embodiment, and no detailed description of the same element will be made as appropriate.

2-1. Configuration of Second Embodiment

Figure 7:
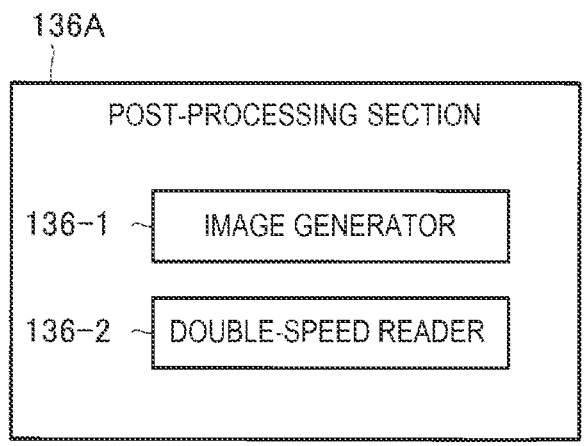
FIG. 7 is a functional block diagram of the post-processing section provided in the display apparatus according to a second embodiment.

FIG. 7 is a functional block diagram of the post-processing section 136A. The post-processing section 136A includes a double-speed reader 136-2 in addition to the image generator 136-1.

The double-speed reader 136-2 reads the projection image generated by the image generator 136-1 and written to the storage apparatus 14 from the storage apparatus 14 at a speed higher than the write speed. The projection image read by the double-speed reader 136-2 is outputted to the output section 137.

2-2. Operation in Second Embodiment

The basic operation of the display apparatus 1 according to the second embodiment is the same as the operation of the display apparatus 1 shown in FIG. 6 and will therefore not be illustrated. In the operation of the display apparatus 1 according to the second embodiment, in step S6 in FIG. 6, the processing apparatus 13 functions as the image generator 136-1 to generate a projection image itself based on the second image signal and write the generated image to the storage apparatus 14. The processing apparatus 13 then functions as the double-speed reader 136-2 to read the projection image from the storage apparatus 14 at a speed higher than the write speed.

2-3. Effects Provided by Second Embodiment

In the display method used by the display apparatus 1 according to the second embodiment, the image generator 136-1 generates the projection image itself based on the second image signal and writes the generated image to the storage apparatus 14. The double-speed reader 136-2 then reads the projection image from the storage apparatus 14 at a speed higher than the write speed.

The thus configured display apparatus 1 can smoothly display the display image through double-speed driving.

3. Third Embodiment

The display apparatus 1 according to a third embodiment is configured in the same manner as the display apparatus 1 according to the first embodiment shown in FIG. 1, except that the pre-processing section 133 is replaced with a pre-processing section 133A. The difference will be described below. In the embodiments presented below by way of example, an element having the same effect and function as that in the first embodiment has the same reference character used in the description of the first embodiment, and no detailed description of the same element will be made as appropriate.

3-1. Configuration of Third Embodiment

Figure 8:
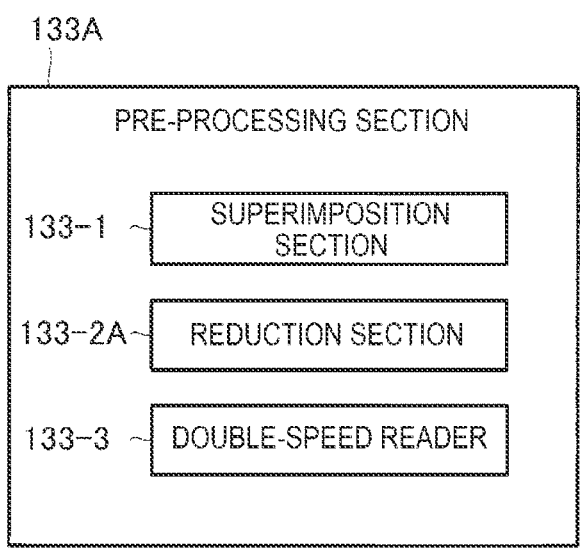
FIG. 8 is a functional block diagram of the pre processing section provided in the display apparatus according to a third embodiment.

FIG. 8 is a functional block diagram of the pre processing section 133A. The pre-processing section 133A includes the superimposition section 133-1, a reduction section 133-2A, and a double-speed reader 133-3.

In the present embodiment, the reduction section 133-2A applies the process corresponding to the process of reducing the first image to the first image signal, and then writes the first image signal having undergone the corresponding process to the storage apparatus 14.

The double-speed reader 133-3 reads the first image signal written by the reduction section 133-2A to the storage apparatus 14 from the storage apparatus 14 at a speed higher than the write speed. The first image signal read by the double-speed reader 133-3 is outputted to the corrector 134.

3-2. Operation in Third Embodiment

The basic operation of the display apparatus 1 according to the third embodiment is the same as the operation of the display apparatus 1 shown in FIG. 6 and will therefore not be illustrated. In the operation of the display apparatus 1 according to the third embodiment, in step S2 in FIG. 6, the processing apparatus 13 functions as the superimposition section 133-1 to apply to the first image signal the process corresponding to the process of superimposing a superimposition image on the first image.

The processing apparatus 13 functions as the reduction section 133-2A to apply to the first image signal the process corresponding to the reduction of the composite image of the first image and the superimposition image. The processing apparatus 13 functions as the reduction section 133-2A to write the first image signal having undergone the corresponding process to the storage apparatus 14.

The processing apparatus 13 functions as the double-speed reader 133-3 to read the first image signal from the storage apparatus 14 at a speed higher than the write speed.

3-3. Effects Provided by Third Embodiment

In the display method used by the display apparatus 1 according to the third embodiment, the reduction section 133-2A applies to the first image signal the process corresponding to the reduction of the composite image of the first image and the superimposition image, and then writes the first image signal to the storage apparatus 14. The double-speed reader 133-3 then reads the first image signal from the storage apparatus 14 at a speed higher than the write speed. The corrector 134 generates the second image signal by applying the first process corresponding to the rotation of the first image to the first image signal read by double-speed reader 133-3 at a speed higher than the write speed.

When there is a large time lag between the timing when the rotation of the display apparatus 1 is sensed and the timing when the image reversely rotated in accordance with the rotation is displayed, the time lag visually affects the display image. The configuration described above, in which the double-speed reading is followed by the image rotation, allows reduction in the discomfort in the displayed display image.

4. Variations

The present disclosure is not limited to the embodiments presented above by way of example. Specific aspects of variations of the embodiments will be presented below by way of example. Two or more aspects arbitrarily selected from the following examples may be combined with each other.

4-1. Variation 1

In the display apparatuses 1 according to the first to third embodiments described above, the reduction factor by which the reduction section 133-2 reduces the projection image 22 is a reduction factor by which the diagonal of the projection image 22 is reduced to be shorter than or equal to the short side of the liquid crystal panel 121. The reduction factor in the embodiments of the present disclosure is, however, not limited to the thus determined reduction factor. FIG. 9 shows the reduction factor in accordance with which the projection image 24 is achieved in Variation 1. When the projection image 22 is reduced to generate the projection image 24, the reduction section 133-2 may change the reduction factor in accordance with the magnitude of the rotation of the projection image 22, as shown in FIG. 9. In more detail, the reduction section 133-2 may reduce the projection image 22 in accordance with the rotation of the projection image 22 by a reduction factor that achieves a size smaller than or equal to the size of the projection image 22 so configured that the two vertices at the opposite ends of the diagonal of the projection image 22 are in contact with the long sides of the liquid crystal panel 121.

4-2. Variation 2

The reduction section 133-2 may instead acquire the reduction factor inputted by a user of the display apparatus 1 via a control apparatus that controls the display apparatus 1, for example, a remote control.

4-3. Variation 3

In the display apparatuses 1 according to the first to third embodiments described above, the reduction section 133-2 provided in the pre-processing section 133 reduces the projection image 22 in advance before the correctors 134 performs the correction. The timing when the projection image 22 is reduced in the embodiments of the present disclosure is, however, not limited to the timing described above. For example, the corrector 134 may incorporate the reduction section 133-2 as a component of the corrector 134 and reduce the projection image 22 while rotating it. Instead, only when the corrector 134 rotates the projection image 22 and then determines that the projection image 22 extends off the liquid crystal panel 121, the reduction section 133-2 incorporated in the corrector 134 may reduce the projection image 22.

4-4. Variation 4

In the display apparatuses 1 according to the first to third embodiments described above, the superimposition section 133-1 superimposes a superimposition image on the first image before the reduction section 133-2 reduces the projection image 22. The superimposition timing in the embodiments of the present disclosure is, however, not limited to the timing described above. For example, after the reduction section 133-2 reduces the first image, the superimposition section 133-1 may perform the process corresponding to the superimposition of the superimposition image on the first image.

4-5. Variation 5

Figure 10:
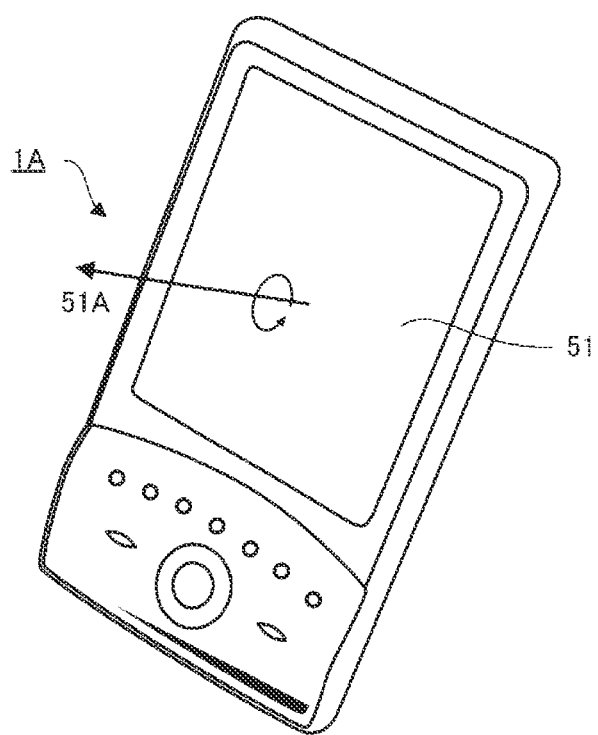
FIG. 10 shows a portable terminal as Variation 5.

The display apparatuses 1 according to the first to third embodiments described above are each a projector, and the display apparatuses according to the embodiments of the present disclosure are not each limited to a projector. For example, the display apparatuses 1 may each be a self-luminous display apparatus including a monitor, a TV, a smartphone, a tablet, or any other portable terminal, such as a liquid crystal display, an organic EL (electro luminescence) display, a plasma display, a micro LED (light emitting diode) displays, a CRT (cathode ray tube) display, and an SED (surface-conduction electron-emitter display). The self-luminous display apparatuses described above are examples of a display. FIG. 10 shows a display apparatus 1A as Variation 5. In this case, the calculator 132 calculates the amount of displacement relating to the rotation of a display section 51, which is provided in the display or the portable terminal, around a central axis 51A. That is, the calculator 132 calculates the amount of rotation of plane light radiated by the display section 51 around the central axis 51A. The corrector 134 then applies the process corresponding to the rotation of the first image to the first image signal in accordance with the amount of rotation of the display or the mobile terminal calculated by the calculator 132.

When the display apparatus 1 is the display described above, the screen which is provided in the display and on which images are displayed corresponds to the display surface.

In the embodiments presented above by way of example, the display apparatus 1 includes the sensor 11, but not necessarily in the present disclosure. For example, the display apparatus 1 may not include the sensor 11, and an inertial sensor separate from the display apparatus 1 may be fixed to an enclosure that is not shown but is part of the display apparatus 1. In this case, the display apparatus 1 may acquire an output value from the inertial sensor via the communication apparatus 15.

In the embodiments described above, the configuration in which a projector that is the display apparatus 1 includes the liquid crystal panel 121, which is an example of the display panel, is presented by way of example, but not necessarily in the present disclosure. For example, the projector, which is the display apparatus 1, may include a digital mirror device (DMD) in place of the liquid crystal panel 121. In this case, the DMD is an example of the display panel.

What is claimed is:

1. A display apparatus controlling method comprising:
accepting input of a first image signal representing a first image;
generating a second image signal by applying a first process of rotating the first image to the first image signal in accordance with an amount of rotation of the display apparatus calculated based on an output signal from an inertial sensor fixed to the display apparatus; and
displaying on a display surface a display image corresponding to a second image based on the second image signal,
wherein after the input of the first image signal is accepted, a second process of reducing the first image by a first reduction factor is applied to the first image signal, and
the second image signal is generated by limiting a frequency band of the first image signal to which the first process is applied, and
the method further comprises accepting the first reduction factor.

2. The display apparatus controlling method according to claim 1,
wherein the display apparatus is a projector including a display panel, and
when the second image does not fall within the display panel, the first process includes the second process of reducing the first image by the first reduction factor.

3. The display apparatus controlling method according to claim 1,
wherein the display apparatus is a display, and
when the display image does not fall within the display surface provided in the display, the first process includes a second process of reducing the first image by a first reduction factor.

4. The display apparatus controlling method according to claim 1,
the first process is applied to the first image signal to which the second process is applied.

5. The display apparatus controlling method according to claim 4,
wherein the display apparatus is a projector including a display panel having an oblong shape,
the first image has an oblong shape, and
the first reduction factor is a reduction factor by which a diagonal of the first image is reduced to be shorter than or equal to a short side of the display panel.

6. The display apparatus controlling method according to claim 4,
wherein the display apparatus is a display having the display surface having an oblong shape,
the display image has an oblong shape, and
the first reduction factor is a reduction factor by which a diagonal of the display image is reduced to be shorter than or equal to a short side of the display surface.

7. The display apparatus controlling method according to claim 4,
wherein the display apparatus is a projector including a display panel having an oblong shape,
the first image has an oblong shape, and
the first reduction factor is a reduction factor by which the first image is reduced to be smaller than or equal to the first image so sized that two vertices at opposite ends of a diagonal of the first image are in contact with long sides of the display panel.

8. The display apparatus controlling method according to claim 4,
wherein the display apparatus is a display having the display surface having an oblong shape,
the display image has an oblong shape, and
the first reduction factor is a reduction factor by which the display image is reduced to be smaller than or equal to the display image so sized that two vertices at opposite ends of a diagonal of the display image are in contact with long sides of the display surface.

9. The display apparatus controlling method according to claim 1, wherein the degree of frequency band limitation is adjusted in accordance with the calculated amount of rotation of the display apparatus.

10. A display apparatus comprising one or more control chips programmed to
accept input of a first image signal representing a first image,
generate a second image signal by applying a first process of rotating the first image to the first image signal in accordance with an amount of rotation of the display apparatus calculated based on an output signal from an inertial sensor fixed to the display apparatus, and
display on a display surface a display image corresponding to a second image based on the second image signal,
wherein the second image signal is generated by using a filter for limiting a frequency band of the first image signal to which the first process is applied.

11. The display apparatus according to claim 10, wherein the degree of frequency band limitation of the filter is adjusted in accordance with the calculated amount of rotation of the display apparatus.

12. A control chip programmed to
accept input of a first image signal representing a first image,
generate a second image signal by applying a first process of rotating the first image to the first image signal in accordance with an amount of rotation of the display apparatus calculated based on an output signal from an inertial sensor fixed to the display apparatus, and output a second image based on the second image signal,
wherein the second image signal is generated by using a filter for limiting a frequency band of the first image signal to which the first process is applied.

13. The control chip according to claim 12, wherein the degree of frequency band limitation of the filter is adjusted in accordance with the calculated amount of rotation of the display apparatus.

\* \* \* \* \*